(12) United States Patent
Wentink (10) Patent No.: US 8,923,177 B2
(45) Date of Patent: Dec. 30, 2014

(54) METHODS AND APPARATUS FOR AVOIDING COLLISIONS

(75) Inventor: Maarten Menzo Wentink, Naarden (NL)

(73) Assignee: QUALCOMM Incorporated, San Diego, CA (US)

(*) Notice: Subject to any disclaimer, the term of this patent is extended or adjusted under 35 U.S.C. 154(b) by 607 days.

(21) Appl. No.: 13/069,356

(22) Filed: Mar. 22, 2011

(65) Prior Publication Data

US 2012/0069781 A1   Mar. 22, 2012

Related U.S. Application Data

(60) Provisional application No. 61/385,416, filed on Sep. 22, 2010.

(51) Int. Cl.
| | | |
|---|---|---|
| G08C 17/00 | (2006.01) | |
| H04B 7/00 | (2006.01) | |
| H04L 1/00 | (2006.01) | |
| H04L 12/26 | (2006.01) | |
| H04J 1/16 | (2006.01) | |
| H04J 3/14 | (2006.01) | |
| H04W 72/12 | (2009.01) | |
| H04W 16/14 | (2009.01) | |

(52) U.S. Cl.
CPC .......... *H04W 72/1215* (2013.01); *H04W 16/14* (2013.01); *H04W 72/1226* (2013.01)
USPC .......... 370/311; 370/310; 370/229; 370/231; 370/232; 370/235

(58) Field of Classification Search
CPC ............ H04W 28/044; H04W 28/046; H04W 28/042; H04W 28/04; H04W 28/02; H04W 28/00
USPC ......... 370/252, 310, 311, 328, 229, 231, 232, 370/235, 237
See application file for complete search history.

(56) References Cited

U.S. PATENT DOCUMENTS

| | | |
|---|---|---|
| 7,079,812 B2 | 7/2006 | Miller et al. |
| 8,457,093 B2 | 6/2013 | Tenny |
| 2007/0109973 A1 | 5/2007 | Trachewsky |
| 2007/0230418 A1 | 10/2007 | Takeuchi et al. |

(Continued)

FOREIGN PATENT DOCUMENTS

| | | |
|---|---|---|
| WO | WO-2008113048 A1 | 9/2008 |
| WO | WO-2009114583 A2 | 9/2009 |

OTHER PUBLICATIONS

IEEED06, "IEEE 802.11z/D6.0: Amendment 6: Extensions to Direct Link Setup (DS)", Aug. 2009, IEEE, all pages.*

(Continued)

*Primary Examiner* — Kwang B Yao
*Assistant Examiner* — Adam Duda
(74) *Attorney, Agent, or Firm* — John J. Ketchum (57) ABSTRACT

A method and apparatus for avoiding collisions is provided. The method may include determining a start of an awake window, determining whether at the start of the awake window a backoff timer has had a zero value for at least one backoff slot. Additionally, the method may include invoking a backoff procedure upon a determination that the backoff timer has had a zero value for at least one backoff slot.

16 Claims, 5 Drawing Sheets

(56) References Cited

U.S. PATENT DOCUMENTS

| | | | |
|---|---|---|---|
| 2008/0225756 | A1 | 9/2008 | Amann et al. |
| 2009/0161687 | A1 | 6/2009 | Yu et al. |
| 2009/0225717 | A1 | 9/2009 | Banerjea |
| 2009/0274082 | A1* | 11/2009 | Wentink .................. 370/311 |
| 2010/0150118 | A1 | 6/2010 | Daum |
| 2010/0165959 | A1 | 7/2010 | Park et al. |
| 2010/0165973 | A1 | 7/2010 | Su et al. |
| 2012/0071101 | A1 | 3/2012 | Wentink et al. |

OTHER PUBLICATIONS

IEEED07, "IEEE 802.11z/D7.0: Amendment 6: Extensions to Direct Link Setup (DS)", Feb. 2010, IEEE, all pages.*

P802.11zD04.0-Feb2009, "Amendment 6: Direct Link Setup", Feb. 2009, IEEE, all pages.*

P802.11zD05.0-Jun2009, "Amendment 6: Direct Link Setup", Jun. 2009, IEEE, all pages.*

P802.11zD06.0-Aug2009, "Amendment 6: Direct Link Setup", Aug. 2009, IEEE, all pages.*

P802.11zD07.0-Feb2010, "Amendment 6: Direct Link Setup", Feb. 2010, IEEE, all pages.*

P802.11zD08.0-Apr2010, "Amendment 6: Direct Link Setup", Apr. 2010, IEEE, all pages.*

P802.11zD11.0-Jul2010, "Amendment 6: Direct Link Setup", Jul. 2010, IEEE, all pages.*

P802.11zD12.0-Jul2010, "Amendment 6: Direct Link Setup", Jul. 2010, IEEE, all pages.*

P802.11zD13.0-Aug2010, "Amendment 6: Direct Link Setup", Aug. 2010, IEEE, all pages.*

"IEEE Recommended Practice for Information Technology—Telecommunications and Information Exchange Between Systems—Local and Metropolitan Area Networks—Specific Requirements Part 15.2: Coexistence of Wireless Personal Area Networks With Other Wireless Devices Operating in Unlicensed Frequency Ba", Jan. 1, 2003, IEEE Standard; [IEEE Standard], IEEE, Piscataway, NJ, USA, pp. 1-115, XP017603614, ISBN: 978-0-7381-3703-2.

International Search Report and Written Opinion—PCT/US2011/052194—ISA/EPO—Dec. 21, 2011.

NTT DoCoMo: "Downlink Interference Coordination Between eNodeB and Home eNodeB", 36PP Draft; R1-101225 Henb_ICIC, 3rd Generation Partnership Project (3GPP), Mobile Competence Centre; 650, Route des Lucioles; F-06921 Sophia-Antipolis Cedex ; France, vol. RAN WGI, No. San Francisco, USA; 20100222, Feb. 16, 2010, XP050418740, [retrieved on Feb. 14, 2010, p. 1-8.

Thomson A., et al., "IEEE P802.11 Wireless LANs Interference Signalling Enhancements," doc: IEEE 802.11-08/0947r01, Mar. 15, 2010.

Perez-Costa X et al., "AU-APSD: Adaptive IEEE 802.11 e Unscheduled Automatic Power Save Delivery," Proceedings of the IEEE International Conference on Communications (ICC '06), Jun. 2006, vol. 5, pp. 2020-2027, ISBN: 1-4244-0355-3.

Thomson A., et al., "Interference Signalling Enhancements," Mar. 17, 2010, doc: IEEE 802.11-10/0079r1, Slides 19.

\* cited by examiner

METHODS AND APPARATUS FOR AVOIDING COLLISIONS

CLAIM OF PRIORITY UNDER 35 U.S.C. §119

The present Application for Patent claims priority to Provisional Application No. 61/385,416 entitled "METHODS AND APPARATUS FOR REDUCING INTERFERENCE AND/OR AVOIDING COLLISIONS" filed Sep. 22, 2010, and assigned to the assignee hereof and hereby expressly incorporated by reference herein.

BACKGROUND

1. Field

The present disclosure relates generally to communication systems, and more particularly, to avoiding collisions.

2. Background

In order to address the issue of increasing bandwidth requirements that are demanded for wireless communications systems, different schemes are being developed to allow multiple user terminals to communicate by sharing the channel resources while achieving high data throughputs. Different wireless technologies have been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters), for example, 802.11 ad/ac/a/b/g/n/z.

Generally, wireless communications systems specified by the IEEE 802.11 standard have a central entity, such as an access point (AP) that manages communications between different devices, also called stations (STAs). Having a central entity may simplify design of communication protocols. Further, although any device capable of transmitting a beacon signal may serve as an AP, for an AP to be effective it may have to have a good link quality to all STAs in a network.

Mobile wireless communications devices (WCD) (e.g., laptops, smartphones, STAs, etc.) may have comparatively reduced capabilities to that of a traditional AP due to factors such as cost, power, form factor, etc. For example, antenna steering capability may be limited to a small sector bound, available power may be limited, location may be variable, etc. Even with these limitations, WCDs may be asked to perform as APs to form peer-to-peer networks for various purposes, such as side-loading, file sharing, etc.

In some aspects, it is desired to improve communications between WLAN STAs. For example, 802.11z defines a power save mechanism in which two STAs are awake at scheduled time periods, referred to as Awake Windows. The power save mechanism is referred to as Peer Power Save Mode (Peer PSM). It is possible, however, for each STA to attempt to transmit a frame to the other STA at the start of the Awake Window. Such an attempt may cause a collision. Therefore, improved collision avoidance protocols may be beneficial so as to not overly penalizing STAs by mandating that they start a backoff at the start of each Awake Window.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with avoiding collisions in a communications system. The method can comprise determining a start of an awake window, and determining whether at the start of the awake window a backoff timer has had a zero value for at least one backoff slot.

Yet another aspect relates to an apparatus. The apparatus can include means for determining a start of an awake window, and means for determining whether at the start of the awake window a backoff timer has had a zero value for at least one backoff slot.

Still another aspect relates to a computer program product comprising a computer-readable medium. The computer-readable medium can include code for determining a start of an awake window, and determining whether at the start of the awake window a backoff timer has had a zero value for at least one backoff slot.

Another aspect relates to an apparatus for communications. The apparatus can include a processing system. The apparatus may also include an enhanced distributed channel access function comprising a backoff timer and a backoff procedure, wherein the processing system is configured to execute the enhanced distributed channel access function to: determine a start of an awake window, and determine whether the backoff timer has a zero value for at least one backoff slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

These and other sample aspects of the invention will be described in the detailed description that follow, and in the accompanying drawings, wherein.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of methods and apparatus are described more fully hereinafter with reference to the accompanying drawings. These methods and apparatus may, however, be embodied in many different forms and should not be construed as limited to any specific structure or function presented throughout this disclosure. Rather, these aspects are provided so that this disclosure will be thorough and complete, and will fully convey the scope of these methods and apparatus to those skilled in the art. Based on the descriptions herein teachings herein one skilled in the art should appreciate that that the scope of the disclosure is intended to cover any aspect of the methods and apparatus disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure herein may be embodied by one or more elements of a claim.

Figure 1:
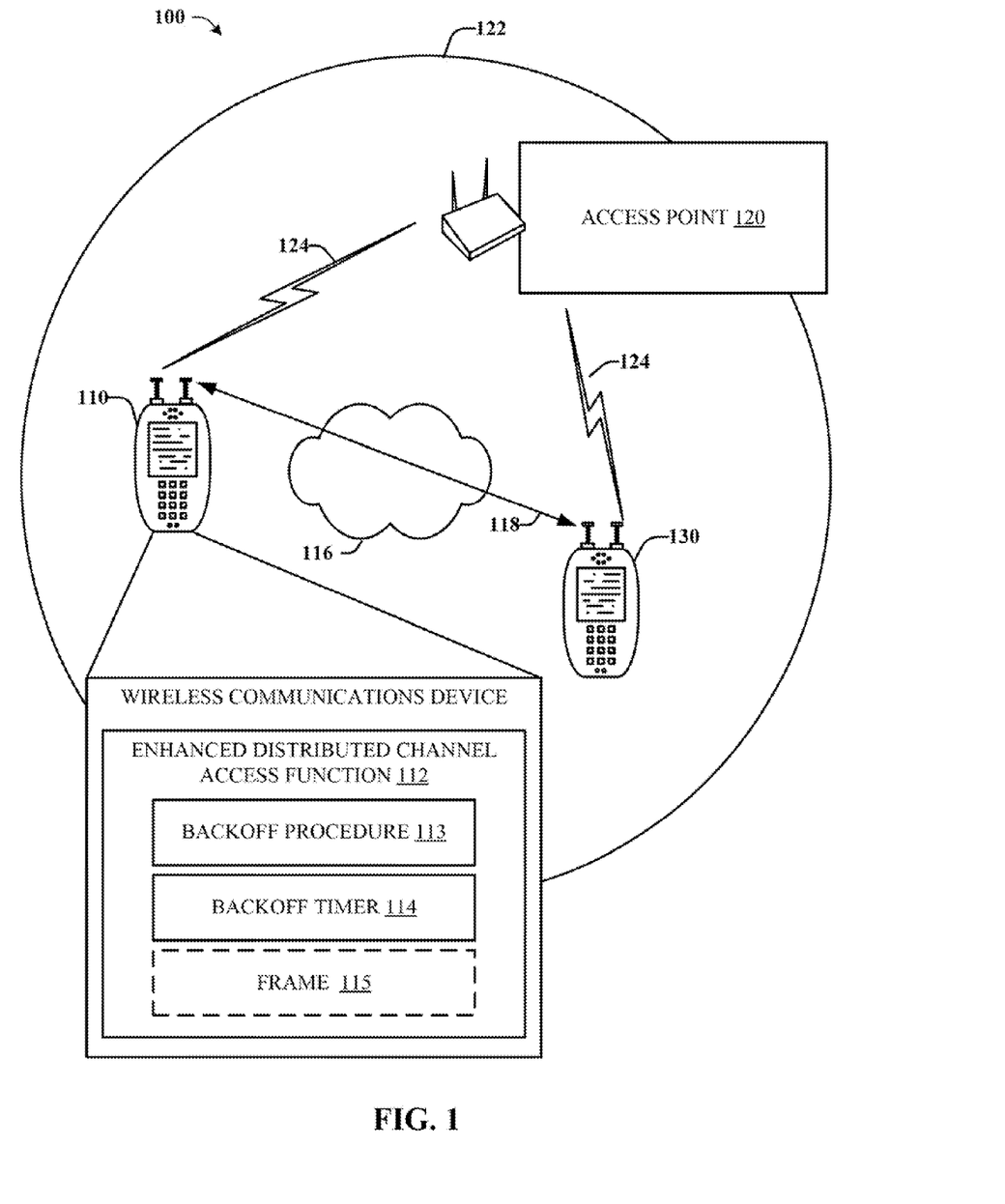
FIG. 1 is a schematic diagram of a communication network including aspects relating to awake window collision avoidance, and alternatively or in addition, aspects relating to interference signaling.

Several aspects of a wireless network will now be presented with reference to FIG. 1. The wireless communication system 100 is shown with several wireless nodes or stations (e.g., STAs), generally designated as nodes 110 and 130, an access point (AP) 120, generally a WLAN device, a base station, etc., wherein the several nodes 110, 130 may communicate using several protocols 118, 124 associated with several networks 116, 122. As used herein, a wireless node 110, 130 may be referred to as a WCD, user equipment (UE), a STA, a laptop, etc. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, a WLAN device, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless communication system 100 may support access terminals distributed throughout a geographic region. AP 120 may be used to provide coordination and control of the access terminals, as well as access to other networks (e.g., Internet). Each STA, which may be fixed or mobile, may use backhaul services of an access point or engage in peer-to-peer communications with other STAs. Examples of STAs include a telephone (e.g., cellular telephone), a laptop computer, a desktop computer, a Personal Digital Assistant (PDA), a digital audio player (e.g., MP3 player), a camera, a game console, or any other suitable wireless node.

In one aspect. STA 110 may seek to establish a communication session with STA 130 using a peer-to-peer protocol 118. In such an aspect, STAs 110 and 130 may communicate during an Awake Window. For example, 802.11z defines a power save mechanism in which two stations (STAs) may be awake at scheduled time periods, referred to as Awake Windows. Additionally, the power save mechanism may be referred to as Peer Power Save Mode (Peer PSM). Further, each of STAs 110 and 130 may include an enhanced distributed channel access functions (EDCAF) 112 to manage and control such communications. Still further, IEEE 802.11z may define a method and/or protocols to set tip a direct link between STAs (e.g., 110 and 130) in the same network 100, together with various mechanisms to allow STAs with direct links between each other to enter a peer PSM. Using the IEEE 802.11z standard protocols, traffic from one STA to another may bypass the AP via a direct link 118.

Figure 3:
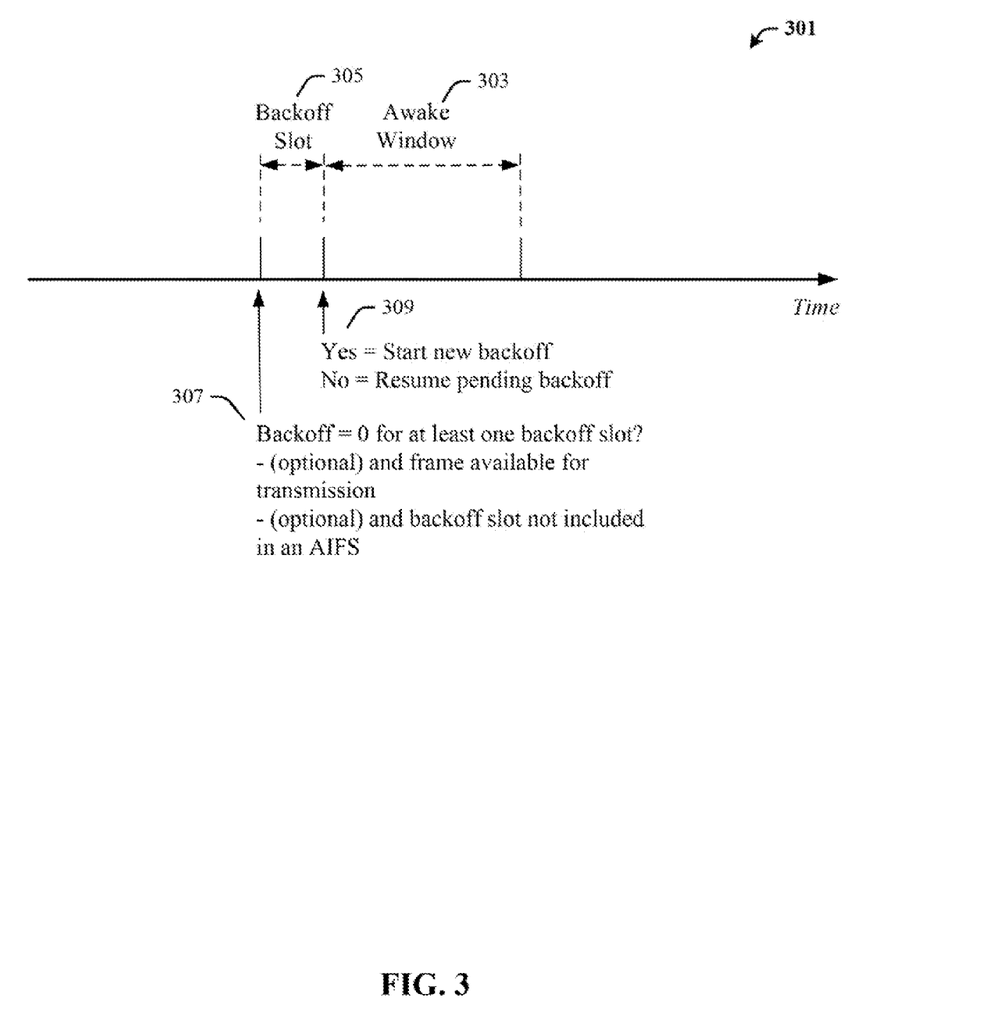
FIG. 3 is a timeline including an awake window and a backoff slot corresponding to aspects of a backoff procedure.

Referring to FIG. 1 and additionally to FIG. 3, which includes a relevant timeline 301, EDCAF 112 may be operable to assist in collision avoidance for communications between STAs 110 and 130. It is noted that the following collision avoidance aspects are illustrated in FIG. 1 with reference to STA 110, however, such aspects may apply as well to STA 130 or any other STA in the system. In one aspect, EDCAF 112 may be operable to invoke a backoff procedure 113 when, at the start of an Awake Window 303 (FIG. 3), there is a frame 115 available for transmission, and a backoff timer 114 has been zero ("Backoff=0") for at least one backoff slot 305 (FIG. 3) (e.g., a backoff slot as defined by IEEE 802.11-2007). Such a determination may be represented by 307 in FIG. 3. In such an aspect, as represented in FIG. 3 by 309, a pending backoff may be continued, but when backoff timer 114 has expired before the start of Awake Window 303 and no further frames are present to transmit, then backoff timer 114 may be restarted at the start of the Awake Window 303. In another aspect, a new backoff timer may be started at the start of the Awake Window 303. Further, in such an aspect, timing of the start of the Awake Window 303 may be communicated to STAs (e.g., STA 110 and STA 130) by AP 120. In another aspect, the timing of the start of the Awake Window 303 may be communicated to STA 110 from another STA (e.g., STA 130).

In another aspect, the EDCAF 112 may be operable to invoke backoff procedure 113 only when, at the start of Awake Window 303, the backoff timer 114 has been zero for at least one backoff slot 305. In one aspect, the backoff timer 114 may be started by the STA 110, and as such may not be zero, when a frame 115 is present for transmission. In such an aspect, backoff timer 114 may be started by STA 110 irrespective of whether a frame 115 is present.

In a further aspect, EDCAF 112 may invoke backoff procedure 113 when backoff timer 114 has expired for at least one backoff slot 305 that is not included in an Arbitration Interframe Space (AIFS). As such, at the start of Awake Window 303 in this aspect, backoff procedure 113 may be invoked if there is a frame 115 available for transmission at that EDCAF 112, and the backoff timer 114 has been zero for at least one backoff slot 305 that is not part of an AIFS.

In still another aspect, EDCAF 112 may be operable to invoke the backoff procedure 113 when, at the start of Awake Window 303, the backoff timer 114 for that EDCAF 112 has been zero for at least one backoff slot 305 that is not part of an AIFS, without regard to whether frame 115 is available for transmission.

In the detailed description that follows, various aspects of the disclosure will be described with reference to any suitable wireless technology, such as Orthogonal Frequency Division Multiplexing (OFDM), Multiple Input Multiple Output (MIMO), etc. OFDM is a spread-spectrum technique that distributes data over a number of subcarriers spaced to provide "orthogonality." Such spacing enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

The wireless STA (e.g., 110, 130), whether an access point or access terminal, may be implemented with a protocol that utilizes a layered structure that includes a physical (PHY) layer that implements all the physical and electrical specifications to interface the wireless node to the shared wireless channel, a Medium Access Control (MAC) layer that coordinates access to the shared wireless channel, and an application layer that performs various data processing functions including, by way of example, speech and multimedia codecs and graphics processing. Additional protocol layers (e.g., network layer, transport layer) may be available for particular application. In some configurations, the wireless node may act as a relay point between an access point and access terminal, or two access terminals, and therefore, may not use an application layer. Those skilled in the art will be readily able to implement the appropriate protocol for any wireless node depending on the particular application and the overall design constraints imposed on the overall system.

Figure 2:
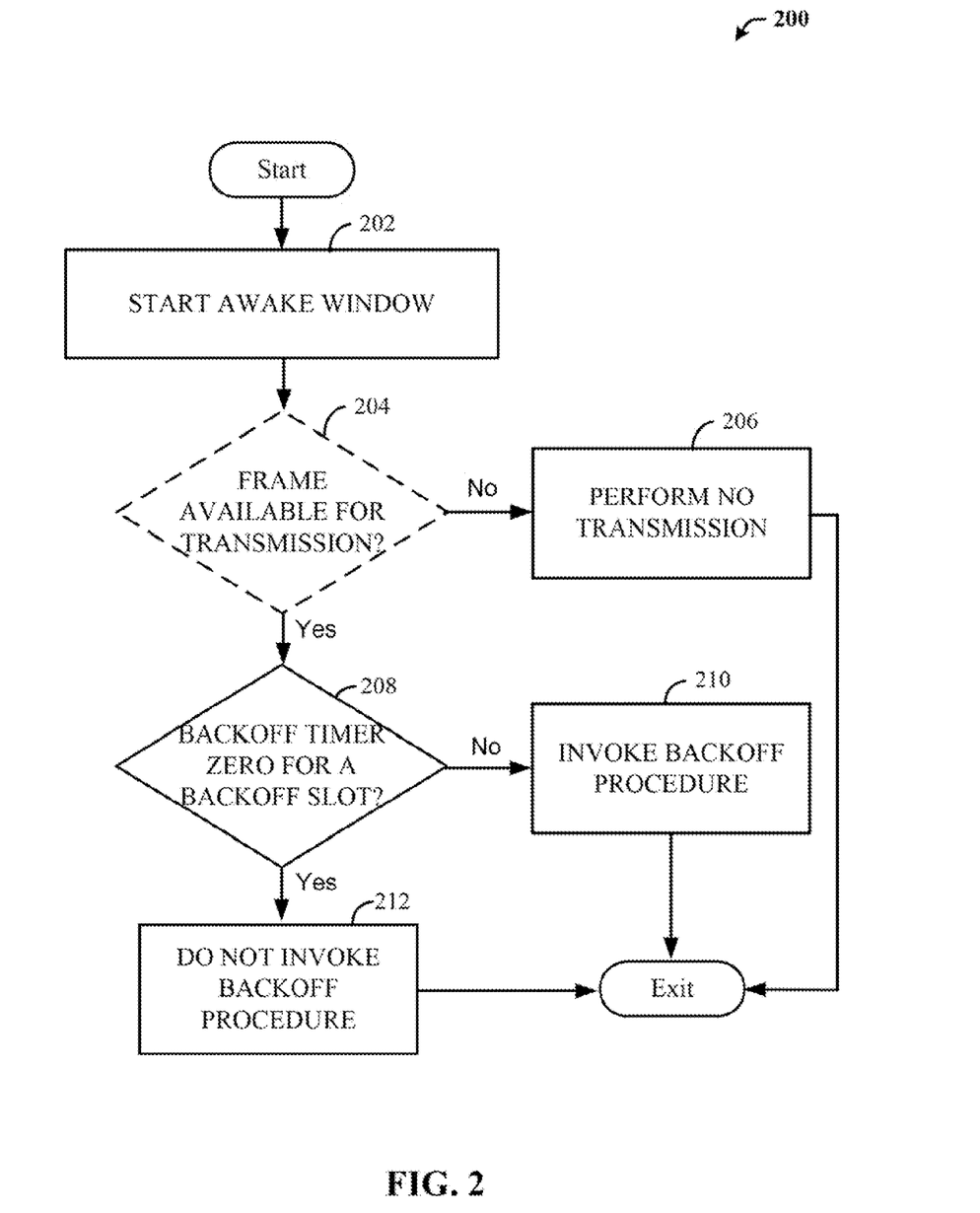
FIG. 2 is a flowchart of an aspect of a method of awake window collision avoidance.

Referring to FIG. 2, a flowchart defining aspects of various methodologies operable in accordance with the subject matter described herein. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, or media.

Referring to FIG. 2, a process 200 is depicted in which a STA may determine whether a collision in peer-to-peer communications may occur. At block 202, an awake window may start. In one aspect, the awake window may start as part of a Peer PSM. In one aspect, the awake window timing and/or the Peer PSM timing may be communicated through the system by an AP and/or another STA. In one optional aspect, at block 204, it is determined whether there is a frame available for transmission. In the optional aspect, at block 204, if it is determined that no frame is available for transmission, then at block 206 no transmission is performed and no backoff procedure is performed. By contrast, if in the optional aspect, at block 204 it is determined that a frame is available for transmission, then at block 208 it is determined if a backoff timer has been zero for at least one backoff slot. In one aspect, the determination may be performed for when a backoff timer has been zero for at least one backoff slot which is not an AIFS.

Further, if optional block 204 is not present, the process 200 may continue to block 208. If at block 208 it is determined the backoff timer has been zero for the defined duration (e.g., a backoff slot, a backoff slot that is not included in an AIFS, etc.), then at block 208 a backoff procedure may be invoked at block 210. In one aspect, invoking a backoff procedure may include delaying transmission and/or reception of content by at least one backoff slot. By contrast, if at block 208 it is determined the backoff timer has not been zero for the defined duration (e.g., a backoff slot, a backoff slot that is not included in an AIFS, etc.) then at block 212 a backoff procedure may not be invoked.

Figure 4:
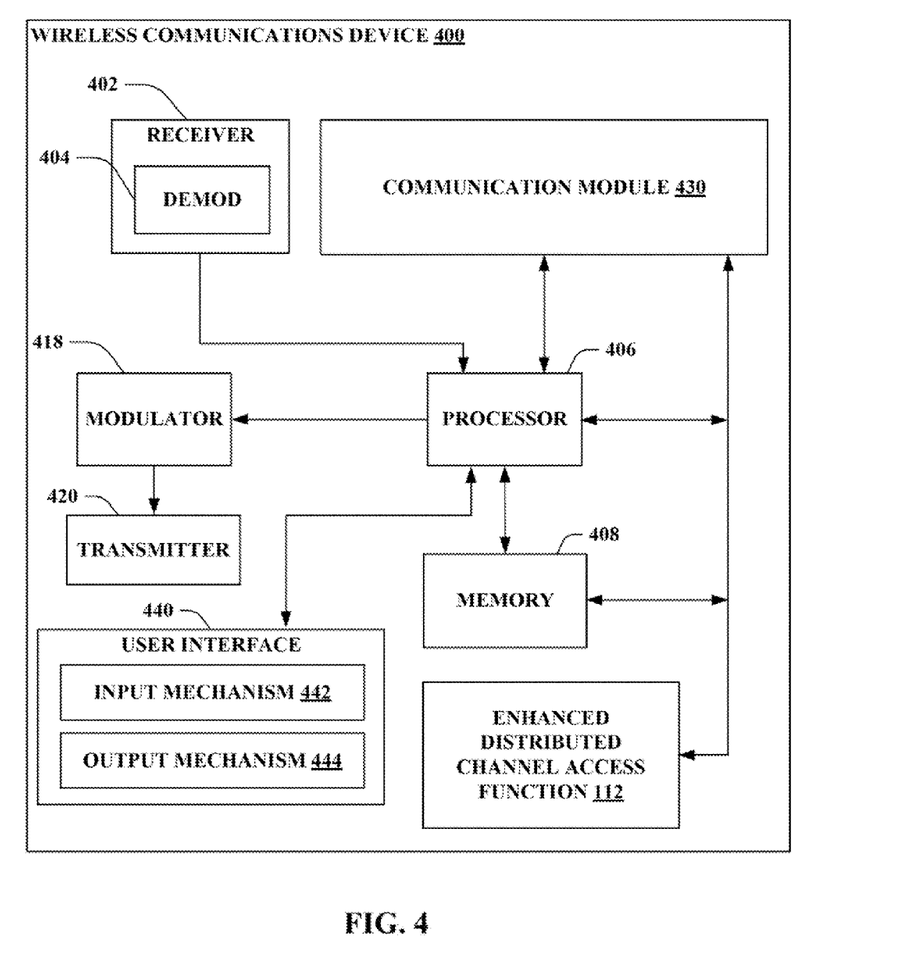
FIG. 4 is a schematic diagram of an aspect of an architecture of a wireless communications device of FIG. 1.

While still referencing FIG. 1, but turning also now to FIG. 4, an example architecture of wireless communications device 110 or 130 (FIG. 1) is illustrated. As depicted in FIG. 4, wireless communications device 400 includes receiver 402 that receives a signal from, for instance, a receive antenna (not shown), performs typical actions on (e.g., filters, amplifies, downconverts, etc.) the received signal, and digitizes the conditioned signal to obtain samples. Receiver 402 may include a demodulator 404 that may demodulate received symbols and provide them to processor 406 for channel estimation. Further, receiver 402 may receive signals from multiple networks using multiple communication protocols. In one aspect, receiver 402 may receive a signal from a network using at least one of: CDMA, WCDMA, TDMA, TD-SCDMA, UMTS, IP, GSM, LTE, WiMax, UMB, EV-DO, 802.11, BLUETOOTH, etc.

Processor 406 may be a processor dedicated to analyzing information received by receiver 402 and/or generating information for transmission by transmitter 420, a processor that controls one or more components of wireless communications device 400, and/or a processor that both analyzes information received by receiver 402, generates information for transmission by transmitter 420, and controls one or more components of wireless communications device 400. Further, signals may be prepared for transmission by transmitter 420 through modulator 418 which may modulate the signals processed by processor 406.

Processor 406 may be operable to provide means for determining a start of an awake window, and means for determining that a backoff timer has a zero value for at least one backoff slot. In one aspect, processor may further be operable to provide means for invoking a backoff procedure upon a determination that the backoff timer has had a zero value for at least one backoff slot. Processor 406 may further include at least one processor enabled to perform one or more of the above described means. 100351 Wireless communications device 400 may additionally include memory 408 that is operatively coupled to, and/or located in, processor 406 and that may store data to be transmitted, data that has been received, information related to available channels, data associated with an analyzed signal and/or interference strength, information related to an assigned channel, power, rate, or the like, and any other suitable information for estimating a channel and communicating via the channel. Memory 408 may additionally store instructions to implement protocols and/or algorithms associated with estimating and/or utilizing a channel (e.g., performance based, capacity based, etc.).

It will be appreciated that data store (e.g., memory 408) described herein may be either volatile memory or nonvolatile memory, or may include both volatile and nonvolatile memory. By way of illustration, and not limitation, nonvolatile memory may include read only memory (ROM), programmable ROM (PROM), electrically programmable ROM (EPROM), electrically erasable PROM (EEPROM), or flash memory. Volatile memory may include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods may include, without being limited to, these and any other suitable types of memory.

Wireless communications device 400 may further include communication module 430 to assist in communications. In an aspect, communications module 430 may include EDCAF 112 (FIG. 1), as described above. In other aspects, however, EDCAF 112 may be a separate component on wireless communication device 400, may be part of memory 408, may be part of processor 406, or any combination thereof.

In one aspect, EDCAF 112 may be operable to assist in collision avoidance of communications between STAs (e.g., 110 and 130). In one aspect, EDCAF 112 may be operable to invoke a backoff procedure 113 (FIG. 1) when, at the start of an Awake Window, there is a frame available for transmission, and a backoff timer 114 (FIG. 1) has been zero for at least one backoff slot. In such an aspect, a pending backoff may be continued, and when a backoff has expired before the start of the Awake Window and no further frames were present to transmit at that point, a new backoff may be started at the start of the Awake Window. In another aspect, the EDCAF 112 may be operable to invoke a backoff procedure when, at the start of an Awake Window, the backoff timer has been zero for at least one backoff slot. In such an aspect, a backoff timer may be started irrespective of whether a frame is present.

In another aspect, EDCAF 112 may indicate that the backoff may have expired for at least one backoff slot that is not included in an Arbitration Interframe Space (AIFS). As such, at the start of an Awake Window, the backoff procedure may be invoked if there is a frame available for transmission at that EDCAF, and the backoff timer has been zero for at least one backoff slot that is not part of an AIFS. In still another aspect, EDCAF 112 may be operable to invoke the backoff procedure where, at the start of an Awake Window, the backoff timer for that EDCAF has been zero for at least one backoff slot that is not part of an AIFS.

Additionally, wireless communications device 400 may include user interface 440. User interface 440 may include input mechanisms 442 for generating inputs into communications device 400, and output mechanism 444 for generating information for consumption by the user of the communications device 400. For example, input mechanism 442 may include a mechanism such as a key or keyboard, a mouse, a touch-screen display, a microphone, etc. Further, for example, output mechanism 444 may include a display, an audio speaker, a haptic feedback mechanism, a Personal Area Network (PAN) transceiver etc. In the illustrated aspects, the output mechanism 444 may include a display operable to present media content that is in image or video format or an audio speaker to present media content that is in an audio format.

Figure 5:
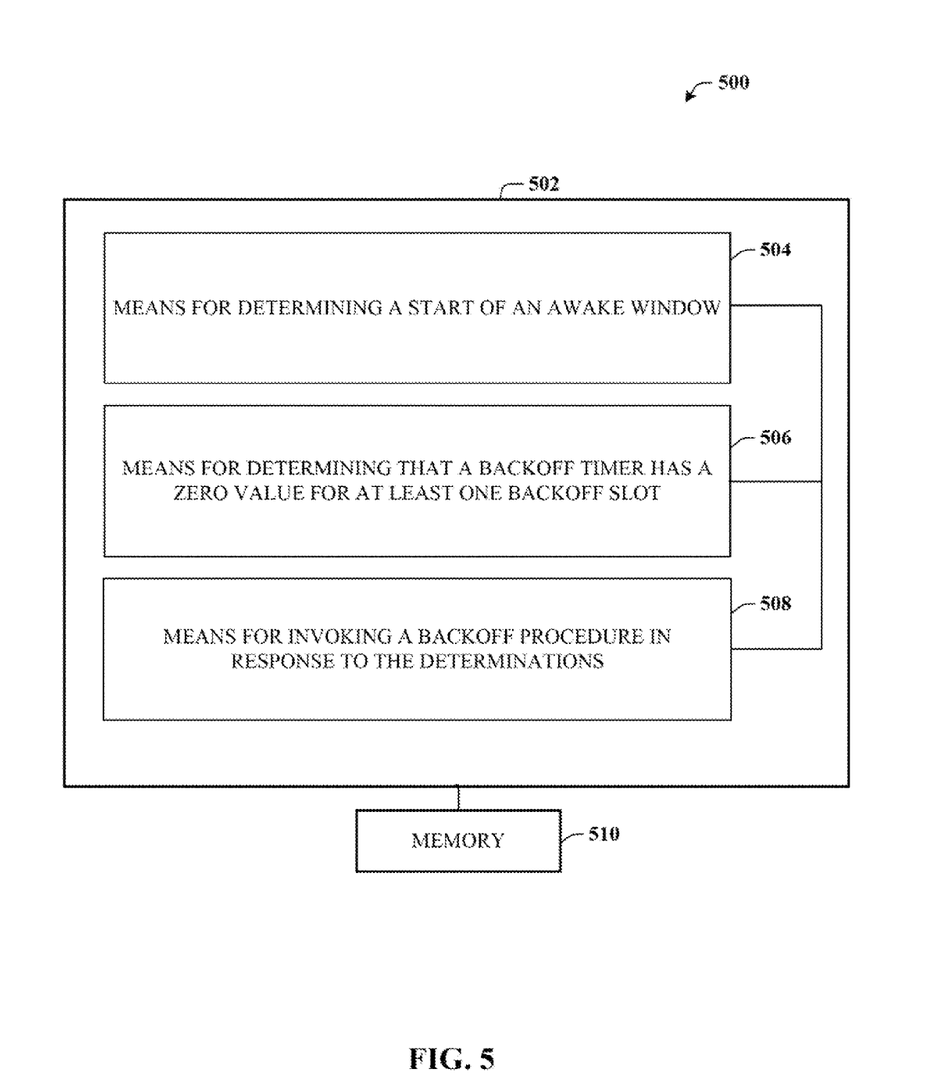
FIG. 5 Illustrates a block diagram of an exemplary communication system that can avoid collisions, according to yet another aspect.

With reference to FIG. 5, illustrated is a system 500 for avoiding collisions, according to one aspect. For example, system 500 can reside at least partially within a WCD, UE, etc. According to another exemplary aspect, system 500 can reside at least partially within an access terminal. It is to be appreciated that system 500 is represented as including functional blocks, which can be functional blocks that represent functions implemented by a processor, software, or combination thereof (e.g., firmware).

System 500 includes a logical grouping 502 of means that can act in conjunction. For instance, logical grouping 502 can include means for determining a start of an awake window 504. Further, logical grouping 502 can include means for determining whether at the start of the awake window a backoff timer has had a zero value for at least one backoff slot 506. In one aspect, the means for determining further include means for determining that the backoff timer has a zero value for at least one backoff slot that is not included in an arbitration interframe space (AIFS).

Still further, in one aspect, logical grouping 502 can include means for invoking a backoff procedure upon a determination that the backoff timer has had a zero value for at least one backoff slot 508. In one aspect, the means for invoking further include means for invoking the backoff procedure invoking a backoff procedure upon a determination that the backoff timer has had a zero value for at least one backoff slot and upon a determination that a frame is available for transmission. In another aspect, the means for invoking further include means for not invoking the backoff procedure upon a determination that a frame is not available for transmission. In another aspect, the means for invoking further include means for invoking the backoff procedure upon a determination that the backoff timer has had a zero value for at least one backoff slot, upon a determination that the at least one backoff slot is not part of the AIFS, and upon a determination that the frame is available for transmission.

Additionally, system 500 can include a memory 510 that retains instructions for executing functions associated with the means 504, 506 and 508. While shown as being external to memory 510, it is to be understood that one or more of the means 504, 506 and 508 can exist within memory 510.

Those skilled in the art will recognize how best to implement the described functionality presented throughout this disclosure depending on the particular application and the overall design constraints imposed on the overall system.

It is understood that any specific order or hierarchy of steps described in the context of a software module is being presented to provide an examples of a wireless node. Based upon design preferences, it is understood that the specific order or hierarchy of steps may be rearranged while remaining within the scope of the invention.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What is claimed is:

1. A method of wireless communications by a first station, comprising:
   determining a start of an awake window;
   determining whether a frame is available for transmission at the start of the awake window;
   determining whether at the start of the awake window a backoff timer has had a zero value for at least one backoff slot; and
   invoking a backoff procedure upon a determination that the backoff timer has had a zero value for at least one backoff slot and upon a determination that the frame is available for transmission.

2. The method of claim 1, further comprising:
   invoking no backoff procedure upon a determination that the frame is not available for transmission.

3. The method of claim 1, wherein the at least one backoff slot is not part of an arbitration interframe space (AIFS).

4. The method of claim 1, further comprising:
   determining whether the at least one backoff slot is not part of an AIFS; and
   invoking a backoff procedure upon a determination that the backoff timer has had a zero value for at least one backoff slot, upon a determination that the at least one backoff slot is not part of the AIFS, and upon a determination that the frame is available for transmission.

5. The method of claim 1, wherein the invoking the backoff procedure further comprises:
   delaying a transmission by at least one backoff slot.

6. The method of claim 1, wherein the determining the start of an awake window comprises determining a 802.11z protocol defined awake window.

7. The method of claim 1, wherein the determining the start of an awake window comprises:
   receiving an awake window timing message from at least one of an access point or a second station.

8. A computer program product, comprising:
   a non-transitory computer-readable medium comprising code executable to:
   determine a start of an awake window;
   determine whether a frame is available for transmission at the start of the awake window;
   determine whether at the start of the awake window a backoff timer has had a zero value for at least one backoff slot; and
   invoke a backoff procedure upon a determination that the backoff timer has had a zero value for at least one backoff slot and upon a determination that the frame is available for transmission.

9. An apparatus for wireless communications, comprising:
   means for determining a start of an awake window;
   means for determining whether a frame is available for transmission at the start of the awake window;
   means for determining that a backoff timer has had a zero value for at least one backoff slot;
   means for invoking a backoff procedure upon a determination that the backoff timer has had a zero value for at least one backoff slot and upon a determination that the frame is available for transmission.

10. An apparatus for wireless communications, comprising:
    a processing system; and
    an enhanced distributed channel access function comprising a backoff timer and a backoff procedure module, wherein the processing system is configured to execute the enhanced distributed channel access function to:
    determine a start of an awake window;
    determine whether a frame is available for transmission at the start of the awake window:
    determine that the backoff timer has had a zero value for at least one backoff slot; and
    invoke a backoff procedure upon a determination that the backoff timer has had a zero value for at least one backoff slot and upon a determination that the frame is available for transmission.

11. The apparatus of claim 10, wherein the enhanced distributed channel access function is further configured to:
    not invoke the backoff procedure module upon a determination that the frame is not available for transmission.

12. The apparatus of claim 10, wherein the at least one backoff slot is not part of an arbitration interframe space (AIFS).

13. The apparatus of claim 10, wherein the enhanced distributed channel access function is further configured to:
    determine whether the at least one backoff slot is not part of an AIFS; and
    invoke the backoff procedure module upon a determination that the backoff timer has had a zero value for at least one backoff slot, upon a determination that the at least one backoff slot is not part of the AIFS, and upon a determination that the frame is available for transmission.

14. The apparatus of claim 10, wherein the backoff procedure module is further configured to delay a transmission by at least one backoff slot when invoked.

15. The apparatus of claim 10, wherein the enhanced distributed channel access function is further configured to determine the start of the awake window using a 802.11z protocol defined awake window.

16. The apparatus of claim 10, wherein the enhanced distributed channel access function is further configured to receive an awake window timing message from at least one of an access point or a station.

* * * * *